United States Patent
Slowinski

(10) Patent No.: US 12,219,981 B1
(45) Date of Patent: Feb. 11, 2025

(54) METHODS AND COMPOSITIONS TO ASSIST AND SUPPORT THE FORMATION OF RED BLOOD CELLS AND HEMOGLOBIN

(71) Applicant: Phoenix Creative Nutraceuticals, LLC, Scottsdale, AZ (US)

(72) Inventor: Piotr Slowinski, Scottsdale, AZ (US)

(73) Assignee: Phoenix Creative Nutraceuticals, LLC, Scottsdale, AZ (US)

( * ) Notice: Subject to any disclaimer, the term of this patent is extended or adjusted under 35 U.S.C. 154(b) by 0 days.

(21) Appl. No.: 18/670,946

(22) Filed: May 22, 2024

(51) Int. Cl.
*A61K 38/00* (2006.01)
*A23L 33/00* (2016.01)
*A23L 33/16* (2016.01)
*A23L 33/18* (2016.01)

(52) U.S. Cl.
CPC ............... *A23L 33/30* (2016.08); *A23L 33/16* (2016.08); *A23L 33/18* (2016.08)

(58) Field of Classification Search
CPC ........... A23L 33/30; A23L 33/16; A23L 33/18
See application file for complete search history.

(56) References Cited

U.S. PATENT DOCUMENTS

2007/0010426 A1 * 1/2007 Mao .................. A61P 3/06
514/16.4

FOREIGN PATENT DOCUMENTS

WO WO-2007121312 A2 * 10/2007 ............. A61K 31/28
WO WO-2011150393 A2 * 12/2011 ........... A61K 31/185

OTHER PUBLICATIONS

US: Office Action in U.S. Appl. No. 18/670,946 dated Sep. 5, 2024.

* cited by examiner

*Primary Examiner* — Aradhana Sasan
*Assistant Examiner* — Mercy H Sabila
(74) *Attorney, Agent, or Firm* — Snell & Wilmer, L.L.P.; April Wurster

(57) ABSTRACT

Disclosed are compositions and methods in the field of nutraceuticals, and in particular to nutraceuticals comprising at least one iron-sequestering glycoprotein and at least one chromium. These compositions find use in supporting formation of red blood cells and hemoglobin. Specifically, disclosed is a composition comprising the combination of apolactoferrin and chromium chloride trivalent to bind iron with the globin protein to regulate iron levels in mammals particularly humans.

20 Claims, No Drawings

METHODS AND COMPOSITIONS TO ASSIST AND SUPPORT THE FORMATION OF RED BLOOD CELLS AND HEMOGLOBIN

FIELD OF THE INVENTION

The disclosure relates to the field of nutraceuticals, and in particular to nutraceuticals comprising at least one iron-sequestering glycoprotein and at least one chromium (specifically, apolactoferrin and chromium chloride trivalent). These compositions find use in preventing iron poisoning, regulating iron absorption, continuous reproduction of red blood cells and hemoglobin cells, protecting the human body from amino acid starvation, management of metabolic abnormalities, supporting glucose metabolism, promoting balanced blood sugar levels (optimizing insulin potency and sustaining proper insulin production levels), supporting overall metabolic balance, combating insulin resistance, and managing diabetes.

BACKGROUND OF THE INVENTION

Iron plays a critical role in various metabolic processes, including oxygen transport, energy production, and immune response. Iron overload occurs when there are excess stores of iron in the body. Excess iron in the blood stream is called free iron. This free iron builds up in the organs, which can cause organ dysfunction and eventually organ failure. With iron dysregulation, humans lose muscles density, size, and strength.

While there are many different chromium nutraceutical formulas on the market, none of them are based on combinations of an iron-sequestering glycoprotein and chromium chloride trivalent. All current commercial chromium formulas are based on combinations of nicotinic acid, picolinic acid, polynicotinate, niacin, Vit. B3, Vit. B6, Vit. B12 which have failed. Thus, there remains a need to regulate iron levels, including regulating low iron levels (deficiency), and high iron levels (iron overload). In the past, iron overload has been treated by removing blood from the body.

SUMMARY OF THE INVENTION

Disclosed are nutraceuticals, and in particular nutraceuticals comprising at least an iron-sequestering glycoprotein and chromium. In some embodiments, the iron-sequestering glycoprotein is apolactoferrin. In some embodiments, the chromium is chromium chloride trivalent. These compositions find use (management, support, prophylactic, prophylaxis) in treating certain abnormalities. For example, these compositions find use in preventing iron poisoning, regulating iron absorption, continuous reproduction of red blood cells and hemoglobin cells, protecting the human body from amino acid starvation, management of metabolic abnormalities, supporting glucose metabolism, promoting balanced blood sugar levels (optimizes insulin potency and sustains proper insulin production levels), supporting overall metabolic balance, combating insulin resistance, managing diabetes, and blocking or limiting iron uptake in immune cells to ease asthma attack symptoms caused by allergens.

In some embodiments, provided are methods of using the disclosed compositions to induce a physiological effect selected from the group consisting of, consisting essentially of, or comprising preventing (reducing the likelihood of occurrence) iron poisoning, regulating iron absorption, continuous reproduction of red blood cells and hemoglobin cells, protecting the human body from amino acid starvation, management of metabolic abnormalities, supporting healthy glucose levels, supporting glucose metabolism, combating insulin resistance, increasing insulin sensitivity, managing diabetes, increasing lean body mass, decreasing body fat, increasing energy, or increasing the feeling of well-being in a subject, comprising: providing a composition comprising at least chromium chloride trivalent and apolactoferrin, and administering the composition to the patient under conditions such that the physiological effect is induced. In some embodiments, the subject has an inherited condition called hemochromatosis.

Further aspects, features and advantages of this invention will become apparent from the detailed description which follow.

Definitions

As used herein, certain terms may have the following defined meanings. As used in the specification and claims, the singular form "a," "an" and "the" include singular and plural references unless the context clearly dictates otherwise. For example, the term "a cell" includes a single cell as well as a plurality of cells, including mixtures thereof.

As used herein the term "about" refers to +/−10%.

As used herein, the term "comprising" is intended to mean that the compositions and methods include the recited elements, but not excluding others. "Consisting essentially of" when used to define compositions and methods, shall mean excluding other elements of any essential significance to the composition or method. "Consisting of" shall mean excluding more than trace elements of other ingredients for claimed compositions and substantial method steps. Embodiments defined by each of these transition terms are within the scope of this disclosure. Accordingly, it is intended that the methods and compositions can include additional steps and components (comprising) or alternatively including steps and compositions of no significance (consisting essentially of) or alternatively, intending only the stated method steps or compositions (consisting of).

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the term "Glucoferrin" refers to a composition comprising at least apolactoferrin and chromium trivalent chloride.

As used herein, the term "composition" As used herein, the term "composition" as used herein has its broadest reasonable meaning, including but not limited to a composition comprising, consisting of, or consisting essentially of a therapeutically effective amount of at least chromium trivalent chloride and at least one iron-sequestering glycoprotein wherein the iron-sequestering glycoprotein is preferably apolactoferrin.

As used herein, the term "iron-sequestering glycoprotein" refers to apolactoferrin, serotransferrins, apo-ovotransferrins and combinations thereof, but excludes holo-Lactoferrin.

As used herein, the term "Chromium" means an essential trace element. Some studies have shown that chromium supplements may help people with type 2 diabetes and insulin resistance, a condition that causes your body to respond poorly to the naturally occurring hormone insulin. There's scientific evidence that chromium can lower glucose levels and improve insulin sensitivity, although not all studies have shown a benefit. It may be that chromium works better in people who are chromium deficient, which usually only happens if you have poor nutrition overall. Other studies have also found that chromium may help with polycystic ovary syndrome (PCOS), which is linked to insulin resistance. Chromium supplements have also been studied for their effects on cholesterol, heart disease risk, psychological disorders, Parkinson's disease, and other conditions. But the study results have been contradictory or unclear. Some people use chromium supplements to build muscle or trigger weight loss. Some chromium studies have shown these benefits, but others haven't.

As used herein, the term "chromium chloride trivalent" "trivalent chromium" or "chromium trivalent chloride" refers to the form of chromium in a valence state of +3. Trivalent chromium is in its stable oxidation state, and under physiological conditions it may form complexes with ligands such as nucleic acids, proteins and organic acids. Chromium Chloride Trivalent is inorganic essential trace mineral (it is not a metal). Chromium Chloride Trivalent is essential for human life and safe as an ingestible nutritional complex. Chromium Chloride Trivalent must be ingested daily from food sources. Chromium Chloride Trivalent is a form of salt that is present in soil. Deficiency of it is proven scientifically to be linked to diabetes and other metabolic abnormalities in all mammals.

Chromium sulfate (trivalent), chromium acetate (trivalent), chromium nitrate (trivalent), chromium chloride (trivalent), or chromium biphosphate (trivalent) are formulations of trivalent chromium are not safe for human consumption and all of which should not be used in the compositions disclosed. Some chromiums such as hexavalent+6 are heavy metals. Chromium Chloride Trivalent+3 in the mineral form, will never convert into the metal form and metal form hexavalent+6 will never convert into the mineral form, this is chemically and biologically impossible.

As used herein, the term "effective amount" means a amount that causes a targeted effect of administration, preferably to prevent an abnormality/disorder in the subject, ameliorate a condition in the subject or improve the well-being of the subject.

As used herein, the term "body fat" refers to the total amount of fat in a subject's body, and is often expressed as a percentage of the total mass of the subject.

As used herein, the term "lean body mass" refers to the mass of a subject minus mass associated with fat content, and is often expressed as a percentage of total mass of a subject. "Lean body mass" is generally the mass of the bone, organs, muscle and proteins of the body such as collagen.

As used herein, the term "functional foods" refers to food products that include biologically active nutraceutical agents.

As used herein, the terms "nutraceutical agent," and related terms, refer to natural, bioactive chemical compounds that have health promoting, abnormality preventing or medicinal properties. Examples of nutraceutical agents include, but are not limited to, *Allium Cepa, Allium Sativum, Aloe Vera, Angelica* Species, Naturally Occurring Antioxidants, *Aspergillus Oryzae* Enzyme Therapy, barley grass, Bromelain, Carnitine, Carotenoids and Flavonoids, Catechin, Centella *Asiatica* (Gotu kola), Coenzyme Q10, Chinese Prepared Medicines, *Coleus Forskohlii, Commiphora Mukul, Crataegus Oxyacantha* (Hawthorne), *Curcuma Longa* (Turmeric), *Echinacea* Species (Purple Coneflower), Eleutherococcus Senticosus (Siberian *Ginseng*), Ephedra Species, Dietary Fish Oil Consumption and Fish Oil Supplementation, Genistein, *Ginkgo Biloba, Glycyrrhiza* (Licorice), *Hypericum* Perforatum (St. John's Wort), Hydrastis (Goldenseal) and Other Berberine-Containing Plants, *Lactobacillus, Lobelia* (Indian Tobacco), *Melaleuca* Alternifolia, *Mentha Piperita*, NGNA, *Panax Ginseng*, Pancreatic Enzymes, Piper Mythisticum, Procyanidolic Oligomers, Pygeum *Africanum*, Quercetin, Sarsaparilla Species, Serenoa *Repens* (Saw palmetto, *Sabal serrulata*), *Silybum Marianum* (Milk Thistle), Rosemary/Lemon balm, Selenite, *Tabebuia* Avellanedae (LaPacho), *Taraxacum Officinale, Tanacetum Parthenium* (Feverfew), Taxol, Uva *Ursi* (Bearberry), *Vaccinium Myrtillus* (Blueberry), Valerian *Officinalis*, Viscum Album (Mistletoe), Vitamin A, Beta-Carotene and Other Carotenoids, and *Zingiber Officinale* (Ginger).

As used herein, the term "weight loss diet regimen" or related terms, is used broadly to include any type of weight loss plan used by a subject. Examples of weight loss diet regimens include, but are not limited to, Atkins diet, Beverly Hills diet, Cabbage Soup diet, DietSmart.com diet, DietWatch.com diet, Fit For Life diet, Grapefruit diet, Herbalife diet, High Protein diet, Jenny Craig diet, Juice Fasts diet, Kashi GoLean diet, Low Fat diet, Mayo Clinic diet, Nutrisystem diet, Perricone diet, Pritkin diet, Ready to Eat diet, Revival Soy diet, Richard Simmons diet, Scarsdale diet, Shakes diet, Slim-Fast diet, Somersizing diet, South Beach diet, Special K diet, Subway diet, Sugar Busters diet, Thin For Life diet, Weight Watchers diet, Zone diet, running, swimming, meditation, yoga, hypnosis, clinical therapy, bicycling, walking, hypnosis, rehabilitory training, a dietary plan provided through a dietician, and surgical procedures.

The terms "subject," "individual" or "patient" are used interchangeably herein, and refer to a vertebrate, preferably a mammal, more preferably a human. Mammals include, but are not limited to, murines, rats, rabbits, simians, bovines, ovines, porcines, canines, felines, farm animals, sport animals, pets, equines, and primates, particularly humans.

As used herein, "pharmaceutically acceptable carrier" includes any material which, when combined with a composition disclosed herein, allows the composition to retain biological activity and is non-reactive with the subject's immune system. Examples include, but are not limited to, any of the standard pharmaceutical carriers such as a phosphate buffered saline solution, water, emulsions such as oil/water emulsions, and various types of wetting agents. Compositions comprising such carriers are formulated by well-known conventional methods (see, for example, Remington's Pharmaceutical Sciences, Chapter 43, 14th Ed., Mack Publishing Co., Easton, Pa.).

As used herein, the term "oral delivery vehicle" refers to any means of delivering a pharmaceutical orally, including, but not limited to, capsules, pills, tablets and syrups.

As used herein, the term "food product" refers to any food or feed suitable for consumption by humans, non-ruminant animals, or ruminant animals. The "food product" may be a prepared and packaged food (e.g., mayonnaise, salad dressing, bread, or cheese food) or an animal feed (e.g., extruded and pelleted animal feed or coarse mixed feed). "Prepared food product" means any pre-packaged food approved for human consumption.

As used herein, the term "foodstuff" refers to any substance fit for human or animal consumption.

As used herein, the term "dietary supplement" refers to a small amount of a compound for supplementation of a human or animal diet packaged in single or multiple does units. Dietary supplements do not generally provide significant amounts of calories but may contain other micronutrients (e.g., vitamins or minerals).

As used herein, the term "nutritional supplement" refers to a composition comprising a "dietary supplement" in combination with a source of calories. In some embodiments, nutritional supplements are meal replacements or supplements (e.g., nutrient or energy bars or nutrient beverages or concentrates).

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

All numerical designations, e.g., pH, temperature, time, concentration, and molecular weight, including ranges, are approximations which are varied (+) or (−) by increments of 0.1. It is to be understood, although not always explicitly stated that all numerical designations are preceded by the term "about". The term "about" also includes the exact value "X" in addition to minor increments of "X" such as "X+0.1" or "X−0.1." It also is to be understood, although not always explicitly stated, that the reagents described herein are merely exemplary and that equivalents of such are known in the art.

Unless otherwise defined, all technical and/or scientific terms used herein have the same meaning as commonly understood by one of ordinary skill in the art. Although methods and materials similar or equivalent to those described herein can be used in the practice or testing of embodiments disclosed herein, exemplary methods and/or materials are described below. In case of conflict, the patent specification, including definitions, will control. In addition, the materials, methods, and examples are illustrative only and are not intended to be necessarily limiting.

While some embodiments comprise/include the disclosed features and may therefore include additional features not specifically described, other embodiments may be essentially free of or completely free of non-disclosed elements—that is, non-disclosed elements may optionally be essentially omitted or completely omitted.

Before explaining at least one embodiment in detail, it is to be understood that the disclosure is not necessarily limited in its application to the details set forth in the following description or exemplified by the Examples. The disclosure is capable of other embodiments or of being practiced or carried out in various ways.

DETAILED DESCRIPTION OF THE INVENTION

Disclosed are compositions and methods comprising, consisting of, or consisting essentially of at least chromium and an iron-sequestering glycoprotein. Disclosed are compositions and methods comprising, consisting of, or consisting essentially of at least chromium chloride trivalent and an iron-sequestering glycoprotein. Disclosed are compositions and methods comprising, consisting of, or consisting essentially of at least chromium and apolactoferrin. Disclosed are compositions and methods comprising, consisting of, or consisting essentially of at least chromium chloride trivalent and apolactoferrin.

Compositions comprising at least chromium and an iron-sequestering glycoprotein find use in inducing physiological responses such as, such as preventing iron poisoning, regulation of iron absorption, continuous reproduction of red blood cells and hemoglobin cells, protection from amino acid starvation, management of metabolic abnormalities, support healthy glucose level, increase insulin sensitivity, manage diabetes, increasing lean body mass, decreasing body fat, increasing energy, or increasing the feeling of well-being in a subject.

In some embodiments, the iron-sequestering glycoprotein is selected from the group consisting of apo-ovotransferrins, apo-lactoferrin and serotransferrins. In some embodiments, the iron-sequestering glycoprotein is apolactoferrin. In some embodiments, the chromium is Chromium Chloride Trivalent and is not chromium sulfate (trivalent), chromium acetate (trivalent), chromium nitrate (trivalent), chromium chloride (trivalent), or chromium biphosphate (trivalent). In some embodiments, the chromium is chromium chloride trivalent.

Glucoferrin

Glucoferrin comprises, consists of or consists essentially of apolactoferrin, chromium trivalent chloride, and other ingredients. Glucoferrin provides the necessary amino acids to form a helix-matrix of the red blood cells and hemoglobin inside red blood cells. The primary structure of proteins deals with the number and sequence of amino acids in a polypeptide chain. One molecule of hemoglobin is made up of four polypeptide chains: two alpha chains and two beta chains. The alpha chain contains 141 amino acids, the beta chain contains 146 amino acids. Thus, a total of 574 amino acids are present in one molecule of Glucoferrin. The sequence of amino acids in alpha chains is different from that of the beta chain. Any disturbance in the normal sequence of amino acids impairs the normal functioning of hemoglobin.

Glucoferrin comprises apolactoferrin having 708 amino acids in the sequence, and when the source of apolactoferrin is mother's milk it contains sulfur bonded amino acids. Sulfur is a main and crucial element that creates a binding effect with nitric oxide into amino acids, to create the "protein tread" to support continuous genetic replication to support life. That is why apolactoferrin is the most essential 708 amino acids to sustain mammalian life. Glucoferrin comprises synergetic sulfur containing 708 amino acid sequence protein, taken daily will provide "limitless multiplication" of amino acids, protecting our body from amino acid starvation stage. Glucoferrin helps to regulate iron homeostasis and is able to correct iron deficiency anemias, iron overload, hemochromatosis and/or ferroptosis (iron induced accelerated natural cell death). Specifically, Glucoferrin binds iron with globin protein to regulate iron levels in mammals, from low-iron deficiency, called Anemia. Glucoferrin also helps up-regulate low iron levels. Glucoferrin also helps down-regulate high iron levels (iron overload) i.e., iron down-regulation. Glucoferrin binds apolactoferrin (protein) iron ions with chromium ions and copper ions with globin molecules, to form hemoglobin. "Glucose Tolerance Factor" is a complex necessary to maintain glucose and oxygen transfer at the cellular level, which is the part of red blood cells and hemoglobin delivery system. Apolactoferrin has an affinity to carry inside the 4 lobes of its own structure chromium ions (−) that attracts iron ions (+) and copper ions (+), this is the ultimate GTF divine design. As such, Glucoferrin has an affinity to carry inside the 4 lobes of its own structure chromium ions (−) that attracts iron ions (+) and copper ions (+).

Heme

The average adult human body contains about 20 to 30 trillion red blood cells. Iron is an essential component in the formation of red blood cells. Once a red blood cell is formed in the bone marrow, Glucoferrin facilitates the transfer of 4 atoms of heme iron from the blood stream into the red blood cell. This enables heme to be more capable to deliver glycogen, oxygen, sulfur, and nitric oxide to cells in human body. At the same time, it will form a protein called Globin inside red blood cells. Glucoferrin will not allow more iron ions inside the red cells than is necessary. Glucoferrin will not form more globin inside the red cells than is necessary. The physiological composition of hemoglobin 4 subunits of Heme iron and Globin protein to transport the above mentioned metabolic components (sulfur, chromium, copper, iron or combinations thereof).

Iron transferred properly into red blood cells equates with strength, iron remaining trapped outside the red blood cells equates with weakness.

Hemoglobin

Iron is stored mainly in the liver and bone marrow. Iron storing cells comprise ferritin protein, made from 349 amino acids. Iron storing cells are designed for temporary iron storage and iron overload protection. Ferritin is a protein in the cells, and is the main storage of iron, notably in liver and bone marrow. Ferritin is a biomarker and a ferritin level test, is a recognized blood test, used to established various autoimmune disorders, such as iron overload-hemochromatosis and ferroptosis, Alzheimer's, Parkinson's, cancer, etc.

Transport of iron is provided by transferrin protein, made from 678 amino acids. Hemoglobin, besides transferring glucose and oxygen into the cells, also removes CO2 and O2 to be exhaled out of the body. Increased CO2 levels are one of the main causes of elevated blood pressure.

Glucoferrin will secrete from its sequence 8 amino acids, to create a bridge, to connect iron with globin which will become hemoglobin. There are four types of hemoglobin in the human body: HbA1C—is the glycated hemoglobin that is bound to glucose. It is used as a marker to monitor blood glucose over time. Hemoglobin is produced and discarded from the body in 120 day, cycles. The above 8 amino acids are the binding bridge of the 4 iron atoms with globin proteins in the formation of red blood cells and hemoglobin.

Glucose Tolerance Factor

Glucoferrin creates glucose tolerance factor (GTF). GTF is a complex that increases insulin sensitivity and reduces insulin resistance in the human body and stabilize functionality of the nutritional delivery system. GTF is first stored in the liver, and then in the other organs, muscles, and finally in the bone marrow. The human body does not produce GTF, it must be obtained and consumed daily in food. GTF deficiency is linked to conditions such as insulin resistance and metabolic syndrome. Common characteristics of insulin resistance are hyperglycemia when blood sugar is too high, hypoglycemia when the blood sugar is too low, increased body weight and the waistline, high blood pressure, and fatigue.

Insulin

Insulin is a vital hormone produced by the pancreas. It plays a crucial role in the metabolism of carbohydrates, sugars, starches, fats, and proteins the chemical processes that occur within a living organism to maintain life. The liver also requires GTF to manufacture fatty acids, lecithin, and lipoproteins. Insulin resistance consists of many metabolic abnormalities and defects causing inability to transport glucose and other nutritional substances into the cellular level. Insulin resistance is associated with several common characteristics, including:

Hyperglycemia (high blood sugar): Insulin resistance can lead to elevated blood sugar levels.

Hypoglycemia (low blood sugar): In some cases, insulin resistance may cause episodes of low blood sugar.

Increased body weight and waistline: Insulin resistance is often accompanied by weight gain, particularly around the waistline.

High blood pressure: Individuals with insulin resistance are at a higher risk of developing hypertension.

Fatigue: Chronic fatigue is a common symptom experienced by those with insulin resistance.

Apolactoferrin

Apolactoferrin is an iron binding glyco-protein. Apolactoferrin is 708 amino acid protein. Apolactoferrin is present in a mother's nursing milk. As used herein apolactoferrin can come from bovines or camels. Apolactoferrin is a type of lactoferrin. There are 3 types of lactoferrin: hololactoferrin-iron saturated, lactoferrin-native, and apolactoferrin. In some embodiments, the composition is essentially free of or completely free of and methods do not use lactoferrin other than apolactoferrin. In some embodiments, the composition is essentially free of or completely free of and methods do not use hololactoferrin, or lactoferrin-native. The key difference between apolactoferrin and native lactoferrin lies in their iron-binding status, which dictates their biological activities and health benefits. Lactoferrin has an iron-bound state. Apolactoferrin is not bound to iron.

Apolactoferrin is known to be capable of regulating iron levels in human metabolism. Apolactoferrin is known to be implicated in the utilization of iron as well globin protein formation, and binding capacity with iron.

Chromium Chloride Trivalent

Chromium Trivalent Chloride has afinity to magnetically bind with iron ions and copper ions. Chromium Ions are a trace mineral.

Microcrystalline Cellulose

Microcrystalline cellulose (C6H10O5) n is refined wood pulp. It is a white, free-flowing powder. Chemically, it is an inert substance, is not degraded during digestion and has no appreciable absorption. In large quantities it provides dietary bulk and may lead to a laxative effect.

Microcrystalline cellulose is a commonly used excipient in the pharmaceutical industry. It has excellent compressibility properties and is used in solid dose forms, such as tablets. Tablets can be formed that are hard, but dissolve quickly. Microcrystalline cellulose is the same as cellulose, except that it meets USP standards.

It is also found in many processed food products, and may be used as an anti-caking agent, stabilizer, texture modifier, or suspending agent among other uses. According to the Select Committee on GRAS Substances, microcrystalline cellulose is generally regarded as safe when used in normal quantities.

Compositions

The composition disclosed herein are a nutraceutical complex designed to address cellular metabolic dysregulations and to improve their designed performance and strengths, by addressing the origin of their abnormalities. Pharmaceutical therapy is based on medication, which the main focus is on the targeting the disease, which is recognized and diagnosed based on single particular blood test biomarker and its possible improvement, its never focused on the origin of the abnormalities. Herein are disclosed how to improve the origin of abnormalities.

In some embodiments, disclosed is a composition comprising, consisting of, or consisting essentially of at least one iron-sequestering glycoprotein and at least one chromium compound. In some embodiments, disclosed is a composition comprising, consisting of, or consisting essentially of an iron-sequestering glycoprotein and a chromium compound. In some embodiments, the chromium is a trivalent chromium. In some embodiments, the chromium is chromium sulfate (trivalent), chromium acetate (trivalent), chromium nitrate (trivalent), chromium chloride (trivalent), chromium biphosphate (trivalent) or combinations thereof. In some embodiments, the iron-sequestering glycoprotein is apo-ovotransferrins, apo-lactoferrin, serotransferrins, or combinations thereof. In some embodiments, disclosed is a composition comprising, consisting of, or consisting essentially of one iron-sequestering glycoprotein and one chromium compound. In some embodiments, disclosed is a composition comprising, consisting of, or consisting essentially of two iron-sequestering glycoprotein and two chromium compounds. In some embodiments, disclosed is a composition comprising, consisting of, or consisting essentially of three iron-sequestering glycoprotein and three chromium compounds. In some embodiments, disclosed is a composition comprising, consisting of, or consisting essentially of one, two, or three iron-sequestering glycoprotein and one, two, or three chromium compounds. In some embodiments, the at least one iron-sequestering glycoprotein is apolactoferrin, serotransferrins, apo-ovotransferrins and/or combinations thereof.

In some embodiments, disclosed is a composition comprising, consisting of, or consisting essentially of apolactoferrin. In some embodiments, disclosed is a composition comprising, consisting of, or consisting essentially of chromium trivalent chloride. In some embodiments, disclosed is a composition comprising, consisting of, or consisting essentially of microcrystalline cellulose. In some embodiments, disclosed is a composition comprising, consisting of, or consisting essentially of apolactoferrin and chromium trivalent chloride. In some embodiments, disclosed is a composition comprising, consisting of, or consisting essentially of apolactoferrin (between 0.1 g and 0.5 g) and chromium chloride trivalent (between 100-350 mcg). In some embodiments, disclosed is a composition comprising, consisting of, or consisting essentially of apolactoferrin (0.2 g) and chromium chloride trivalent (between 100-350 mcg). In some embodiments, disclosed is a composition comprising, consisting of, or consisting essentially of apolactoferrin (between 0.1 g and 0.5 g) and chromium chloride trivalent (175 mcg). In some embodiments, disclosed is a composition comprising, consisting of, or consisting essentially of apolactoferrin (0.2 g) and chromium chloride trivalent (175 mcg). In some embodiments, the apolactoferrin is bound to sulfur. In some embodiments, the apolactoferrin is bound to chromium ions. In some embodiments, the apolactoferrin is bound to iron ions. In some embodiments, the apolactoferrin is bound to copper ions. In some embodiments, the apolactoferrin is bound to sulfur, chromium, copper, iron or combinations thereof.

In some embodiments, disclosed are compositions which include at least chromium chloride trivalent, and one or more iron-sequestering glycoprotein. Preferably, the iron-sequestering glycoprotein is apolactoferrin. In some embodiments, disclosed are compositions which include at least one chromium compound and apolactoferrin. Preferably, the chromium compound is chromium trivalent chloride.

In some embodiments, disclosed is a composition comprising, consisting of, or consisting essentially of apolactoferrin and microcrystalline cellulose. In some embodiments, disclosed is a composition comprising, consisting of, or consisting essentially of chromium trivalent chloride, and microcrystalline cellulose. In some embodiments, disclosed is a composition comprising, consisting of, or consisting essentially of apolactoferrin, chromium trivalent chloride, and microcrystalline cellulose.

In some embodiments, disclosed is a composition comprising, consisting of, or consisting essentially of apolactoferrin and whey protein isolate. In some embodiments, disclosed is a composition comprising, consisting of, or consisting essentially of chromium trivalent chloride, and whey protein isolate. In some embodiments, disclosed is a composition comprising, consisting of, or consisting essentially of apolactoferrin, chromium trivalent chloride, and whey protein isolate.

In some embodiments, disclosed is a composition comprising, consisting of, or consisting essentially of apolactoferrin and buttermilk powder. In some embodiments, disclosed is a composition comprising, consisting of, or consisting essentially of chromium trivalent chloride, and buttermilk powder. In some embodiments, disclosed is a composition comprising, consisting of, or consisting essentially of apolactoferrin, chromium trivalent chloride, and buttermilk powder.

In some embodiments, disclosed is a composition comprising, consisting of, or consisting essentially of apolactoferrin, chromium trivalent chloride, whey protein isolate, and buttermilk powder. In some embodiments, disclosed is a composition comprising, consisting of, or consisting essentially of apolactoferrin, chromium trivalent chloride, microcrystalline cellulose, and whey protein isolate. In some embodiments, disclosed is a composition comprising, consisting of, or consisting essentially of apolactoferrin, chromium trivalent chloride, microcrystalline cellulose, and buttermilk powder. In some embodiments, disclosed is a composition comprising, consisting of, or consisting essentially of apolactoferrin, chromium trivalent chloride, microcrystalline cellulose, whey protein isolate, and buttermilk powder.

In some embodiments, disclosed is a composition comprising, consisting of, or consisting essentially of a blend of the following ingredients: apolactoferrin-iron binding glycoprotein, chromium chloride trivalent, whey protein isolate, buttermilk powder.

In some embodiments, the composition is essentially free of or completely free of (and methods do not use) nicotinic acid, picolinic acid, polynicotinate, niacin, Vit. B3, B6, B12, lactoferrin, hexavalent chromium (chromium (VI)), metallic chromium (Cr 0), or combinations thereof. In some embodiments, the composition is essentially free of or completely free of (and methods do not use) iron-saturated (full or partial) lactoferrin. In some embodiments, the composition is essentially free of or completely free of (and methods do not use) a source of iron. In some embodiments, the method does not comprise removing blood from the subject's body to reduce iron. In some embodiments, the composition comprises a form of lactoferrin that is iron free and does not comprise a form of lactoferrin that is bound to iron. In some embodiments, the composition is essentially free of or completely free of (and methods do not use) holo-Lactoferrin. In some embodiments, the composition is essentially free of or completely free of (and methods do not use) Chromium sulfate (trivalent), chromium acetate (trivalent), chromium nitrate (trivalent), chromium chloride (trivalent), and/or chromium biphosphate (trivalent).

The disclosure is not limited to the use of any particular iron-sequestering glycoprotein, chromium, or protein. The present invention is not limited to the use of any particular apolactoferrin, chromium chloride trivalent, or protein. In some embodiments, the protein is selected from the group consisting of, consisting essentially of, or comprising whey protein isolate or buttermilk powder. In some embodiments, the apolactoferrin, chromium chloride trivalent, microcrystalline cellulose, or protein is from a natural source. In some embodiments, the apolactoferrin, chromium chloride trivalent, microcrystalline cellulose, or protein is from a non-natural source (synthetically made).

In some embodiments, the composition is a nutraceutical complex, pharmaceutical grade, and/or non-GMO nutritional dietary supplement. In some embodiments, the composition further comprises amino acids and/or vitamins. In some embodiments, the composition does not contain amino acids and/or vitamins.

In some embodiments, the composition further comprises, consists of, or consists essentially of protein such as whey protein isolate, buttermilk powder and combinations thereof. In some embodiments, the composition comprises, consists of, or consists essentially of apolactoferrin, chromium trivalent chloride, microcrystalline cellulose, a carrier and a stabilator. In some embodiments, the carrier and stabilator are whey protein isolate, and buttermilk powder. In some embodiments, disclosed is a composition comprising, consisting of, or consisting essentially of chromium chloride trivalent, apolactoferrin, and milk. In some embodiments, disclosed is a composition comprising, consisting of, or consisting essentially of protein (between 0.1 g and 0.5 g), apolactoferrin, and chromium chloride trivalent (between 100-350 mcg). In some embodiments, disclosed is a composition comprising, consisting of, or consisting essentially of protein, apolactoferrin (between 0.1 g and 0.5 g), and chromium chloride trivalent (between 100-350 mcg).

In some embodiments, the apolactoferrin is greater than about 70%, 80%, 90%, 95% or 99% pure. In some embodiments, the chromium trivalent chloride is greater than about 70%, 80%, 90%, 95% or 99% pure. In some embodiments, the microcrystalline cellulose is greater than about 70%, 80%, 90%, 95% or 99% pure. In some embodiments, the whey protein isolate is greater than about 70%, 80%, 90%, 95% or 99% pure. In some embodiments, the buttermilk powder is greater than about 70%, 80%, 90%, 95% or 99% pure.

In some embodiments, the composition comprises effective amounts of an iron-sequestering glycoprotein and chromium. In some embodiments, the composition comprises effective amounts of an iron-sequestering glycoprotein and chromium trivalent chloride. In some embodiments, the composition comprises effective amounts of apolactoferrin and chromium. In some embodiments, the composition comprises effective amounts of apolactoferrin and chromium trivalent chloride. In some embodiments, the composition comprises an effective amount of the apolactoferrin and chromium trivalent chloride to cause the desired physiological response in a subject, preferably in a once a day or twice a day dosage. In some embodiments, the dosage is 2 capsules a day with food. In some embodiments, the dosage can be increased if needed or recommended by healthcare professional. In some embodiments, an effective amount of the apolactoferrin is from 0.1-10 grams, and most preferably from 0.5-2 grams or 0.1 to 0.2 grams daily or 0.2 grams daily or 0.2 grams twice daily. In some embodiments, an effective amount of the chromium trivalent chloride is from 100-350 mcg (micrograms), and most preferably from 100-225 mcg or 175 mcg daily, or 175 mcg twice daily. In some embodiments, an effective amount of the microcrystalline cellulose is from 2 grams (g) to 10.0 g daily, and most preferably from 2 g to 5 g or 5 g daily, or 5 g twice daily. In some embodiments, the compositions contain, for example, a daily dosage of between 0.1 g and 0.5 g of apolactoferrin, between 100-350 mcg of chromium trivalent chloride, and between 2 g and 10.0 g of the microcrystalline cellulose. In some embodiments, the compositions contain, for example, a daily dosage of between 0.1 g and 0.5 g of an iron-sequestering glycoprotein, between 100-350 mcg of chromium trivalent chloride, and between 2 g and 10.0 g of the microcrystalline cellulose. In some embodiments, the compositions contain, for example, a daily dosage of between 0.1 g and 0.5 g of an iron-sequestering glycoprotein, between 100-350 mcg of chromium, and between 2 g and 10.0 g of the microcrystalline cellulose. In some embodiments, the compositions contain, for example, a daily dosage of between 0.1 g and 0.5 g of an iron-sequestering glycoprotein and between 100-350 mcg of chromium.

In some embodiments, the ratio of apolactoferrin to chromium trivalent chloride ranges between 100:1 to 1:100. More preferably, the ratio of apolactoferrin to chromium trivalent chloride ranges between 10:1 to 100:1.

Disclosed is a composition comprising an iron-sequestering glycoprotein and isolated chromium trivalent chloride. In some embodiments, iron-sequestering glycoprotein and isolated chromium trivalent chloride are provided in a wt/wt ratio of from 100:1 to 9:1. In some embodiments, the concentration of the iron-sequestering glycoprotein is 10-25 wt %, In some embodiments, the concentration of chromium is 0.5-10 wt %. In some embodiments, the chromium trivalent chloride is complexed to a metal selected from the group consisting of zinc, copper, manganese, chromium, aluminum and gallium. In some embodiments, the composition further comprises a compound selected from the group consisting of phospholipids, antioxidants, vitamins, amino acids, proteins, essential minerals, lecithin and combinations thereof. In some embodiments, the the vitamin is one or more selected from the group consisting of vitamin A, thiamine, niacinamide, pyridoxine, riboflavin, cyanocobalamin, biotin, pantothenic acid, vitamin C, vitamin D, vitamin E, vitamin K and folic acid. In some embodiments, the mineral is one or more selected from the group consisting of iron, calcium, magnesium, sodium, potassium, copper, chromium, zinc, molybdenum, iodine, boron, selenium, manganese, and combinations thereof.

In some embodiments, the effective amount is the amount necessary to prevent iron poisoning, regulate iron absorption, facilitate continuous reproduction of red blood cells and hemoglobin cells, protects the human body from amino acid starvation, manage metabolic abnormalities, support healthy glucose levels, increase insulin sensitivity, and/or help manage diabetes. In some embodiments, the administration of the composition increases lean body mass, decreases body fat, increases energy, or increases the feeling of well-being in a subject.

In some embodiments, provided are compositions comprising an effective amount of at least two of apolactoferrin, chromium trivalent chloride, and microcrystalline cellulose. In some embodiments, the composition is formulated for oral delivery. In some embodiments, the composition is formulated for topical delivery. In some embodiments, the composition is a dietary supplement. In some embodiments, the composition is a nutritional supplement. In some embodiments, the composition is provided in a food or a drink. In some embodiments, the composition further comprises a physiologically acceptable carrier.

The combination of apolactoferrin and chromium trivalent chloride is designed to provide natural support to assist iron absorption in the intestines and help regulate iron levels in the human body.

Dietary Supplements

Disclosed are dietary supplements comprising an iron-sequestering glycoprotein and chromium. Disclosed are dietary supplements comprising apolactoferrin and chromium. Disclosed are dietary supplements comprising iron-sequestering glycoprotein and chromium trivalent chloride.

Disclosed are dietary supplements comprising apolactoferrin and chromium trivalent chloride. Disclosed are dietary supplements comprising apolactoferrin, chromium trivalent chloride, and microcrystalline cellulose. In some embodiments, the supplements comprise a combination of one or more of apolactoferrin, chromium trivalent chloride, and microcrystalline cellulose, each provided in an effective amount. Other nutraceuticals agents may also be included in the supplement. Nutraceutical agents are natural, bioactive chemical compounds that have health promoting, abnormality preventing or medicinal properties. Examples of nutraceuticals include, but are not limited to, *Allium cepa, Allium sativum, Aloe vera, Angelica* Species, Naturally Occurring Antioxidants, *Aspergillus oryzae*, barley grass, Bromelain, Carnitine, carotenoids and flavonoids, Catechin, *Centella asiatica* (Gotu kola), Coenzyme Q10, Chinese Prepared Medicines, *Coleus forskohlii, Commiphora mukul*, Conjugated Linoleic Acids (CLAs), *Crataegus oxyacantha* (Hawthorne), *Curcuma longa* (Turmeric), *Echinacea* Species (Purple Coneflower), Eleutherococcus senticosus (Siberian Ginseng), Ephedra Species, Dietary Fish Oil, Genistein, *Ginkgo biloba, Glycyrrhiza* (Licorice), *Hypericum* perforatum (St. John's Wort), Hydrastis (Goldenseal) and other Berberine-containing plants, *Lactobacillus, Lobelia* (Indian Tobacco), *Melaleuca* alternifolia, Menaquinone, *Mentha piperita, n*-glycolylneuraminic acid (NGNA), *Panax Ginseng*, Pancreatic Enzymes, Piper mythisticum, Procyanidolic Oligomers, Pygeum *africanum*, Quercetin, Sarsaparilla species, Serenoa *repens* (Saw palmetto, *Sabal serrulata*), *Silybum marianum* (Milk Thistle), Rosemary/Lemon balm, Selenite, *Tabebuia* avellanedae (LaPacho), *Taraxacum officinale, Tanacetum parthenium* (Feverfew), Taxol, Uva *ursi* (Bearberry), *Vaccinium myrtillus* (Blueberry), Valerian *officinalis*, Viscum album (Mistletoe), Vitamin A, Beta-Carotene and other carotenoids, and *Zingiber officinale* (Ginger).

In some embodiments, the composition also includes a viable or a non-viable probiotic which is *L. acidophilus, L. amylovorus, L. animalis, L. bavaricus, L. brevis, L. bulgaricus, L. casei* spp. *casei, L. casei* spp. *rhamnosus, L. crispatus, L. delbrueckii* spp. *lactis, L. eichmanni, L. fermentum, L. helveticus, L. jensenii, L. kefir, L. paracasei, L. pentosus, L. plantarum, L. reuteri, L. salivarius, L. sake, Leu. cremoris, Leu. lactis; B. adolescentis, B. animalis, B. bifidum, B. breve, B. infantis, B. longum*, and *B. thermophilum; Ped. acidilactici, Ped. pentosus, Pep. assacharolyticus, Pep. productus; Pro. acidipropionici, Pro. freudenreichii, Pro. jensenii, Pro. theonii, Strep. cremoris, Strep. faecium, Strep. lactis, Strep. raffinolactis* or *Strep. thermophilus*.

The disclosed dietary supplements may be delivered in any suitable format, including, but not limited to, dermal delivery, oral delivery, or mucosal delivery. In some embodiments, dietary supplements are formulated for oral delivery. The dietary supplements disclosed herein may further be administered by an oral delivery vehicle. The dietary supplements disclosed herein may further be administered in any form (e.g., pill, food product, etc.). In some embodiments, the dietary supplements are provided as a beverage, bar, powder, pill, or shake (e.g., a nutritional supplement as described in more detail below).

The dietary supplements disclosed herein may be taken one or more times daily. Preferably, the dietary supplement is administered orally one to two times daily. Frequency of administration will, of course, depend on the dose per unit (capsule or tablet) and the desired level of ingestion. Dose levels/unit can be adjusted to provide the recommended levels of ingredients per day (e.g., approximately 0.2 g of apolactoferrin and 175 mcg of chromium trivalent chloride in a reasonable number of units (e.g., one capsule or tablet taken twice a day). In some embodiments, the doses add up each day to the daily intake of each ingredient. In some embodiments, the dietary supplements are taken with meals or before meals. In other embodiments, the dietary supplements are not taken with meals. In some embodiments, the dietary supplements are taken with water. In other embodiments, the dietary supplements are not taken with water. In some embodiments, a dietary supplement increases satiety and results in a decrease in caloric intake and subsequent weight loss.

The dietary supplements disclosed are further used in conjunction with a weight loss diet regimen. The disclosure is not limited to a particular kind of weight loss diet regimen (e.g., exercise, reduced calorie intake, etc.). In some embodiments, the weight loss diet regimen is a dietary plan (e.g., Atkins diet, Beverly Hills diet, Cabbage Soup diet, DietSmart.com diet, DietWatch.com diet, Fit For Life diet, Grapefruit diet, Herbalife diet, High Protein diet, Jenny Craig diet, Juice Fasts diet, Kashi GoLean diet, Low Fat diet, Mayo Clinic diet, Nutrisystem diet, Perricone diet, Pritkin diet, Ready to Eat diet, Revival Soy diet, Richard Simmons diet, Scarsdale diet, Shakes diet, Slim-Fast diet, Somersizing diet, South Beach diet, Special K diet, Subway diet, Sugar Busters diet, Thin For Life diet, Weight Watchers diet, and Zone diet. In still other preferred embodiments, the weight loss diet regimen is an exercise plan (e.g., running, swimming, meditation, yoga, hypnosis, clinical therapy, bicycling, walking, etc.). In still other preferred embodiments, the weight loss diet regimen is a clinically assisted plan (e.g., hypnosis, rehabilitory training, a dietary plan provided through a dietician, surgical procedures, etc.).

The ingredients of the dietary supplement are contained in acceptable excipients and/or carriers for oral consumption. The actual form of the carrier, and thus, the dietary supplement itself, is not critical. The carrier may be a liquid, gel, gelcap, capsule, powder, solid tablet (coated or non-coated), tea, or the like. The dietary supplement is preferably in the form of a tablet or capsule and most preferably in the form of a hard gelatin capsule. Suitable excipient and/or carriers include maltodextrin, calcium carbonate, dicalcium phosphate, tricalcium phosphate, microcrystalline cellulose, dextrose, rice flour, magnesium stearate, stearic acid, croscarmellose sodium, sodium starch glycolate, crospovidone, sucrose, vegetable gums, lactose, methylcellulose, povidone, carboxymethylcellulose, corn starch, and the like (including mixtures thereof). Preferred carriers include calcium carbonate, magnesium stearate, maltodextrin, and mixtures thereof. The various ingredients and the excipient and/or carrier are mixed and formed into the desired form using conventional techniques. The tablet or capsule disclosed herein may be coated with an enteric coating that dissolves at a pH of about 6.0 to 7.0. A suitable enteric coating that dissolves in the small intestine but not in the stomach is cellulose acetate phthalate. Further details on techniques for formulation for and administration may be found in the latest edition of Remington's Pharmaceutical Sciences (Maack Publishing Co., Easton, Pa.).

In other embodiments, the supplement is provided as a powder or liquid suitable for adding by the consumer to a food or beverage. For example, in some embodiments, the dietary supplement can be administered to an individual in the form of a powder, for instance to be used by mixing into a beverage, or by stirring into a semi-solid food such as a pudding, topping, sauce, puree, cooked cereal, or salad dressing, for instance, or by otherwise adding to a food.

The dietary supplement may comprise one or more inert ingredients, especially if it is desirable to limit the number of calories added to the diet by the dietary supplement. For example, the dietary supplement disclosed herein may also contain optional ingredients including, for example, herbs, vitamins, minerals, enhancers, colorants, sweeteners, flavorants, inert ingredients, and the like. For example, the dietary supplement disclosed herein may contain one or more of the following: asorbates (ascorbic acid, mineral ascorbate salts, rose hips, acerola, and the like), dehydroepiandrosterone (DHEA), Fo-Ti or Ho Shu Wu (herb common to traditional Asian treatments), Cat's Claw (ancient herbal ingredient), green tea (polyphenols), inositol, kelp, dulse, bioflavinoids, maltodextrin, nettles, niacin, niacinamide, rosemary, selenium, silica (silicon dioxide, silica gel, horsetail, shavegrass, and the like), spirulina, zinc, and the like. Such optional ingredients may be either naturally occurring or concentrated forms.

In some embodiments, the dietary supplements further comprise vitamins and minerals including, but not limited to, calcium phosphate or acetate, tribasic; potassium phosphate, dibasic; magnesium sulfate or oxide; salt (sodium chloride); potassium chloride or acetate; ascorbic acid; ferric orthophosphate; niacinamide; zinc sulfate or oxide; calcium pantothenate; copper gluconate; riboflavin; beta-carotene; pyridoxine hydrochloride; thiamin mononitrate; folic acid; biotin; chromium chloride or picolinate; potassium iodide; sodium selenate; sodium molybdate; phylloquinone; vitamin D3; cyanocobalamin; sodium selenite; copper sulfate; vitamin A; vitamin C; inositol; potassium iodide. Suitable dosages for vitamins and minerals may be obtained, for example, by consulting the U.S. RDA guidelines.

Nutritional Supplements

In other embodiments, the present invention provides nutritional supplements (e.g., energy bars or meal replacement bars or beverages) comprising at least apolactoferrin and chromium trivalent chloride. The nutritional supplement may serve as meal or snack replacement and generally provide nutrient calories. Preferably, the nutritional supplements provide carbohydrates, proteins, and fats in balanced amounts. The nutritional supplement can further comprise carbohydrate, simple, medium chain length, or polysaccharides, or a combination thereof. A simple sugar can be chosen for desirable organoleptic properties. Uncooked cornstarch is one example of a complex carbohydrate. If it is desired that it should maintain its high molecular weight structure, it should be included only in food formulations or portions thereof which are not cooked or heat processed since the heat will break down the complex carbohydrate into simple carbohydrates, wherein simple carbohydrates are mono- or disaccharides. The nutritional supplement contains, in one embodiment, combinations of sources of carbohydrate of three levels of chain length (simple, medium and complex; e.g., sucrose, maltodextrins, and uncooked cornstarch).

Sources of protein to be incorporated into the nutritional supplement of the invention can be any suitable protein utilized in nutritional formulations and can include whey protein, whey protein concentrate, whey powder, egg, soy flour, soy milk soy protein, soy protein isolate, caseinate (e.g., sodium caseinate, sodium calcium caseinate, calcium caseinate, potassium caseinate), animal and vegetable protein and mixtures thereof. When choosing a protein source, the biological value of the protein should be considered first, with the highest biological values being found in caseinate, whey, lactalbumin, egg albumin and whole egg proteins. In some embodiments, the protein is a combination of whey protein concentrate and calcium caseinate. These proteins have high biological value; that is, they have a high proportion of the essential amino acids. See Modern Nutrition in Health and Disease, eighth edition, Lea & Febiger, publishers, 1986, especially Volume 1, pages 30-32.

The nutritional supplement can also contain other ingredients, such as one or a combination of other vitamins, minerals, antioxidants, fiber and other dietary supplements (e.g., protein, amino acids, choline, lecithin, omega-3 fatty acids). Selection of one or several of these ingredients is a matter of formulation, design, consumer preference and end-user. The amounts of these ingredients added to the dietary supplements of this invention are readily known to the skilled artisan. Guidance to such amounts can be provided by the U.S. RDA doses for children and adults. Further vitamins and minerals that can be added include, but are not limited to, calcium phosphate or acetate, tribasic; potassium phosphate, dibasic; magnesium sulfate or oxide; salt (sodium chloride); potassium chloride or acetate; ascorbic acid; ferric orthophosphate; niacinamide; zinc sulfate or oxide; calcium pantothenate; copper gluconate; riboflavin; beta-carotene; pyridoxine hydrochloride; thiamin mononitrate; folic acid; biotin; chromium chloride or picolinate; potassium iodide; sodium selenate; sodium molybdate; phylloquinone; vitamin D3; cyanocobalamin; sodium selenite; copper sulfate; vitamin A; vitamin C; inositol; potassium iodide.

Flavors, coloring agents, spices, nuts and the like can be incorporated into the product. Flavorings can be in the form of flavored extracts, volatile oils, chocolate flavorings, peanut butter flavoring, cookie crumbs, crisp rice, vanilla or any commercially available flavoring. Examples of useful flavoring include, but are not limited to, pure anise extract, imitation banana extract, imitation cherry extract, chocolate extract, pure lemon extract, pure orange extract, pure peppermint extract, imitation pineapple extract, imitation rum extract, imitation strawberry extract, or pure vanilla extract; or volatile oils, such as balm oil, bay oil, bergamot oil, cedarwood oil, walnut oil, cherry oil, cinnamon oil, clove oil, or peppermint oil; peanut butter, chocolate flavoring, vanilla cookie crumb, butterscotch or toffee. In one embodiment, the dietary supplement contains cocoa or chocolate.

Emulsifiers may be added for stability of the final product. Examples of suitable emulsifiers include, but are not limited to, lecithin (e.g., from egg or soy), and/or mono- and di-glycerides. Other emulsifiers are readily apparent to the skilled artisan and selection of suitable emulsifier(s) will depend, in part, upon the formulation and final product.

Preservatives may also be added to the nutritional supplement to extend product shelf life. Preferably, preservatives such as potassium sorbate, sodium sorbate, potassium benzoate, sodium benzoate or calcium disodium EDTA are used.

In addition to the carbohydrates described above, the nutritional supplement can contain natural or artificial (preferably low calorie) sweeteners, e.g., saccharides, cyclamates, aspartamine, aspartame, acesulfame K, and/or sorbitol. Such artificial sweeteners can be desirable if the nutritional supplement is intended to be consumed by an overweight or obese individual, or an individual with type II diabetes who is prone to hyperglycemia.

The nutritional supplement can be provided in a variety of forms, and by a variety of production methods. In some embodiments, to manufacture a food bar, the liquid ingredients are cooked; the dry ingredients are added with the liquid ingredients in a mixer and mixed until the dough phase is reached; the dough is put into an extruder, and extruded; the extruded dough is cut into appropriate lengths; and the product is cooled. The bars may contain other nutrients and fillers to enhance taste, in addition to the ingredients specifically listed herein.

Servings of the nutritional supplement preferably contain for example, a daily dosage of between 0.1 and 0.5 of apolactoferrin and 100-350 mcg of chromium trivalent chloride, or between 0.1 and 0.2 g of apolactoferrin and 100-225 mcg chromium trivalent chloride, preferably 0.2 g of apolactoferrin, 175 mcg chromium trivalent chloride.

Servings of the nutritional supplement preferably contain for example, a daily dosage of between 0.1 and 0.5 of apolactoferrin, 100-350 mcg of chromium trivalent chloride, and 3-5 g of microcrystalline cellulose, or between 0.1 and 0.2 g of apolactoferrin, 100-225 mcg chromium trivalent chloride, and 10 and 20 g microcrystalline cellulose, preferably 0.2 g of apolactoferrin, 175 mcg chromium trivalent chloride, and between 10 and 20 g microcrystalline cellulose. It is understood by those of skill in the art that other ingredients can be added to those described herein, for example, fillers, emulsifiers, preservatives, etc. for the processing or manufacture of a nutritional supplement.

Food Products

In still further embodiments, the present invention provides functional foods, including food products, prepared food products, or foodstuffs comprising at least apolactoferrin and chromium trivalent chloride. For example, in some embodiments, beverages and solid or semi-solid foods comprising apolactoferrin and chromium trivalent chloride are provided. These forms can include, but are not limited to, beverages (e.g., soft drinks, milk and other dairy drinks, and diet drinks), baked goods, puddings, dairy products, confections, snack foods, or frozen confections or novelties (e.g., ice cream, milk shakes), prepared frozen meals, candy, snack products (e.g., chips), soups, spreads, sauces, salad dressings, prepared meat products, cheese, yogurt and any other fat or oil containing foods, and food ingredients (e.g., wheat flour).

Servings of the food product preferably contain between 1.0 g and 10.0 g of the apolactoferrin, chromium trivalent chloride, and microcrystalline cellulose.

Methods

Disclosed is the use of a composition comprising at least apolactoferrin and chromium trivalent chloride. Disclosed is the use of a composition comprising at least apolactoferrin, chromium trivalent chloride, and microcrystalline cellulose. Disclosed is the use of a composition comprising at least apolactoferrin and chromium trivalent chloride to treat iron poisoning, regulation of iron absorption, continuous reproduction of red blood cells and hemoglobin cells, protection from amino acid starvation, management of metabolic abnormalities, support healthy glucose level, increase insulin sensitivity, manage diabetes, increasing lean body mass, decreasing body fat, increasing energy, or increasing the feeling of well-being in a subject.

In some embodiments, the administration of the composition prevents or eliminates iron poisoning. In some embodiments, the administration of the composition promotes regulation of iron absorption. In some embodiments, the administration of the composition promotes production of red blood cells. In some embodiments, the administration of the composition promotes production of hemoglobin cells. In some embodiments, the administration of the composition promotes management of metabolic abnormalities. In some embodiments, the administration of the composition protects the human body from amino acid starvation, supports healthy glucose levels, increases insulin sensitivity, helps manage diabetes, increases lean body mass, decreases body fat, increases energy, increases the feeling of well-being, and combinations thereof in a subject. In some embodiments, the administration of the composition induces weight reduction in a subject.

The disclosed methods are not limited to any particular delivery method. In some embodiments, the composition is delivered orally. In some embodiments, the composition is administered topically. In some embodiments, the composition is delivered as a cosmetic composition.

The methods disclosed herein further comprise administering the composition comprising apolactoferrin, chromium trivalent chloride, and microcrystalline for about 90-120 days to the mammalian subject. The methods disclosed herein further comprise administering the composition comprising apolactoferrin, chromium trivalent chloride, and microcrystalline for 1-7 years to the mammalian subject. The methods disclosed herein further comprise testing the subject's blood for biomarkers after administration. The methods disclosed herein further comprise testing the subject's blood for biomarkers about 90-120 after administration. The methods disclosed herein further comprise testing the subject's blood for HbA1c-hemoglobin after administration. In some embodiments, hemoglobin A1c (HbA1c) is reduced at day 120 after administration compared to day 1. In some embodiments, hemoglobin A1c (HbA1c) is reduced by about 2-50% at day 120 after administration compared to day 1. The methods disclosed herein further comprise testing the subject's blood for Bilirubin after administration. In some embodiments, Bilirubin is reduced at day 120 after administration compared to day 1. In some embodiments, Bilirubin is reduced by about 2-50% at day 120 after administration compared to day 1. The methods disclosed herein further comprise testing the subject's blood for HbA1c and/or Bilirubin after administration. In some embodiments, HbA1c and/or Bilirubin is reduced at day 120 after administration compared to day 1. In some embodiments, HbA1c and/or Bilirubin is reduced by about 2-50% at day 120 after administration compared to day 1. Indeed, healthcare professionals can measure the performance of the composition comprising apolactoferrin and chromium trivalent chloride every 90-120 days.

In some embodiments, the subject's blood is tested for biomarkers selected from the group comprising: insulin, hbA1C, hemoglobin, iron serum, hematocrit, MCV, MCHC, ferritin, transferrin, total protein, bilirubin, c-reactive protein, total iron binding capacity TIBC, cholesterol and combinations thereof.

The methods disclosed herein further comprise administering the composition comprising 0.2 g apolactoferrin, 175 mcg chromium trivalent chloride for about 90-120 days to the mammalian subject.

Regulation of Iron

Disclosed is a composition comprising apolactoferrin and chromium trivalent chloride used in the regulation of iron in a subject.

Disclosed is the use of a composition comprising apolactoferrin and chromium trivalent chloride used in the regulation of iron in a subject.

Disclosed is a method of regulating iron in a mammalian subject comprising: administering a composition comprising apolactoferrin and chromium trivalent chloride to the subject under conditions such that the composition is capable of upregulating iron when the subject is in an iron deficiency state such as iron anemia, to down regulate iron when the subject is in an iron overload state such as hemochromatosis, and combinations thereof.

Formation of Hemoglobin

Disclosed is a composition comprising apolactoferrin and chromium trivalent chloride for the formation of hemoglobin in a subject.

Disclosed is the use of a composition comprising apolactoferrin and chromium trivalent chloride for the formation of hemoglobin in a subject.

Disclosed is a method of forming red blood cells and/or hemoglobin in a mammalian subject comprising: administering a composition comprising apolactoferrin and chromium trivalent chloride to the subject under conditions such that the composition binds apolactoferrin (protein) iron ions with chromium ions and copper ions with globin molecules to form hemoglobin in the subject.

Formation of GTF

Disclosed is a composition comprising apolactoferrin and chromium trivalent chloride for the assimilation of GTF from food in a subject.

Disclosed is the use of a composition comprising apolactoferrin and chromium trivalent chloride for the assimilation of GTF from food in a subject.

Disclosed is a method of forming GTF in a mammalian subject comprising administering a composition comprising apolactoferrin and chromium trivalent chloride to the subject under conditions such that the composition binds apolactoferrin (protein) iron ions with chromium ions and copper ions with globin molecules for the assimilation of GTF from food in a subject.

Embodiments disclosed herein provide formulations that provide effective assimilation of GTF while supporting iron regulation.

Combat Insulin Resistance

Disclosed is a composition comprising apolactoferrin and chromium trivalent chloride to prevent, ameliorate or improve insulin resistance.

Disclosed is the use of nutraceutical compositions comprising apolactoferrin and chromium trivalent chloride to prevent, ameliorate or improve insulin resistance.

Disclosed is a method of preventing, ameliorating or improving insulin resistance in a mammalian subject comprising administering a composition comprising apolactoferrin and chromium trivalent chloride to the subject under conditions such that the composition binds apolactoferrin (protein) iron ions with chromium ions and copper ions with globin molecules to prevent, ameliorate or improve insulin resistance.

In some embodiments, the composition is used to optimize insulin potency and/or sustain proper insulin production levels.

Optimize Glucose Metabolism

Disclosed is a composition comprising apolactoferrin and chromium trivalent chloride to optimize glucose metabolism.

Disclosed is the use of nutraceutical compositions comprising apolactoferrin and chromium trivalent chloride to optimize glucose metabolism.

Disclosed is a method of optimizing glucose metabolism in a mammalian subject comprising administering a composition comprising apolactoferrin and chromium trivalent chloride to the subject under conditions such that the composition binds apolactoferrin (protein) iron ions with chromium ions and copper ions with globin molecules to optimize glucose metabolism.

Disclosed is a method of optimizing glucose metabolism in a mammalian subject comprising administering a composition comprising one or more compounds which promote iron regulation in the blood and organs. In some embodiments, the compounds are apolactoferrin and chromium trivalent chloride.

Support Overall Well-being

Disclosed is a composition comprising apolactoferrin and chromium trivalent chloride to support a subject's overall well-being.

Disclosed is the use of nutraceutical compositions comprising apolactoferrin and chromium trivalent chloride to support a subject's overall well-being.

Disclosed is a method to support a subject's overall well-being comprising administering a composition comprising apolactoferrin and chromium trivalent chloride to the subject under conditions such that the composition binds apolactoferrin (protein) iron ions with chromium ions and copper ions with globin molecules to support a subject's overall well-being.

Prevention of Autoimmune Abnormality

As discussed, hemoglobin removes CO2, CO, and excessive leftovers of iron from organs and the blood stream to protect mammalian bodies from iron overload (Hemochromatosis), protects against iron poisoning, and protects against autoimmune abnormalities.

Disclosed is a composition comprising apolactoferrin and chromium trivalent chloride to protect against autoimmune abnormalities.

Disclosed is the use of nutraceutical compositions comprising apolactoferrin and chromium trivalent chloride to protect against autoimmune abnormalities.

Disclosed is a method of using a composition comprising apolactoferrin and chromium trivalent chloride to prevent autoimmune abnormalities comprising: administering to the subject under conditions such that the composition binds apolactoferrin (protein) iron ions with chromium ions and copper ions with globin molecules to prevent autoimmune abnormalities.

In some embodiments, the compositions and methods reduce iron build up in at least one organ of the subject. In some embodiments, the organ is the liver, brain or heart. In some embodiments, the compositions and methods reduce iron buildup and reduces the likelihood of cancer, irregular heartbeat, cirrhosis of the liver, diabetes, darkening of the skin, abnormal heart rhythm, or arthritis.

Methods of Preparing

Disclosed are methods of preparing a nutraceutical which includes one or more of the following steps: Obtaining chromium trivalent chloride; Obtaining apolactoferrin; combining the apolactoferrin and chromium trivalent chloride; freeze-drying or spray-drying the combined fractions; and milling the freeze-dried or spray-dried combined fractions to obtain apolactoferrin: chromium trivalent chloride premix.

Disclosed are methods of preparing a nutraceutical which includes one or more of the following steps: Obtaining chromium trivalent chloride; Obtaining apolactoferrin; combining the apolactoferrin and chromium trivalent chloride; spray-drying the combined fractions; and spray-dried combined fractions to obtain apolactoferrin: chromium trivalent chloride premix.

Disclosed are methods of preparing a composition for use in preventing iron poisoning, regulating iron absorption, continuous reproduction of red blood cells and hemoglobin cells, protecting the human body from amino acid starvation, management of metabolic abnormalities, supporting glucose metabolism, promoting balanced blood sugar levels (optimizing insulin potency and sustaining proper insulin production levels), supporting overall metabolic balance, combating insulin resistance, and managing diabetes.

The disclosure can be further understood by the following numbered paragraphs:

1. A composition comprising an iron-sequestering glycoprotein and chromium.
2. The composition of claim 1, wherein the iron-sequestering glycoprotein is apolactoferrin.
3. The composition of claim 2, wherein chromium is chromium trivalent chloride.
4. The composition of claim 2, wherein the apolactoferrin is provided in an effective amount, wherein the effective amount of apolactoferrin is from about 0.1 to 0.5 grams.
5. The composition of claim 3, wherein the chromium trivalent chloride is provided in an effective amount, wherein the effective amount of chromium trivalent chloride is from about 100-350 mcg.
6. The composition of claim 3, wherein the apolactoferrin and chromium trivalent chloride are provided in an effective amount, wherein the effective amount of apolactoferrin is from about 0.1 to 0.5 grams, and wherein the effective amount of chromium trivalent chloride is from about 100-350 mcg.
7. The composition of claim 1, wherein the iron-sequestering glycoprotein and chromium are provided in an effective amount, wherein the effective amount of iron-sequestering glycoprotein is from about 0.1 to 0.5 grams, and wherein the effective amount of chromium is from about 100-350 mcg.
8. The composition of claim 1, wherein the composition further comprises milk, whey protein isolate, buttermilk powder, microcrystalline cellulose, and combinations thereof.
9. The composition of claim 1, wherein the composition is a dietary supplement.
10. The composition of claim 1, wherein the composition is a nutritional supplement and/or provided in a food or a drink.
11. The composition of claim 1, wherein the apolactoferrin binds sulfur, chromium, copper, iron or combinations thereof.
12. The composition of claim 3, wherein the apolactoferrin and chromium trivalent chloride are from a natural source.
13. The composition of claim 1, wherein the composition is essentially free of or completely free of hololactoferrin, lactoferrin, or lactoferrin-native, nicotinic acid, picolinic acid, polynicotinate, niacin, Vit. B3, Vit. B6, Vit. B12, Chromium sulfate (trivalent), chromium acetate (trivalent), chromium nitrate (trivalent), chromium chloride (trivalent), chromium biphosphate (trivalent), or combinations thereof.

What is claimed is:

1. A method of forming red blood cells and hemoglobin in a subject comprising:
    administering an effective amount of a composition comprising apolactoferrin and chromium trivalent chloride to the subject, and the effective amount of apolactoferrin is from about 0.1 to 0.5 grams and the effective amount of chromium trivalent chloride is from about 100-350 mcg wherein the composition is free of hololactoferrin and lactoferrin-native.

2. The method of claim 1, wherein the composition is essentially free of or completely free of Chromium sulfate (trivalent), chromium acetate (trivalent), chromium nitrate (trivalent), chromium chloride (trivalent), and chromium biphosphate (trivalent).

3. The method of claim 2, wherein the apolactoferrin and chromium trivalent chloride are provided in an effective amount, the effective amount of apolactoferrin is about 0.2 grams, and the effective amount of chromium trivalent chloride is about 175 mcg.

4. The method of claim 1, wherein the composition is a dietary supplement.

5. The method of claim 1, wherein the composition is a nutritional supplement.

6. The method of claim 1, wherein the composition is provided in a food or a drink.

7. The method of claim 1, wherein the composition is essentially free of or completely free of nicotinic acid, picolinic acid, polynicotinate, niacin, Vit. B3, Vit. B6, and Vit. B12.

8. The method of claim 1, wherein the composition is administered for about 120 days.

9. The method of claim 8, wherein after about 120 days iron overload in at least one organ of the subject is reduced.

10. The method of claim 8, wherein after about 120 days hemoglobin A1c (HbA1c) and/or bilirubin is reduced compared to day 1.

11. The method of claim 1, wherein the composition binds apolactoferrin with chromium ions and copper ions with globin molecules to form hemoglobin in the subject.

12. A method of forming red blood cells and hemoglobin in a subject comprising:
    administering an effective amount of a composition comprising apolactoferrin and chromium trivalent chloride to the subject, and the effective amount of chromium trivalent chloride is from about 100-350 mcg, and the effective amount of apolactoferrin is from about 0.1 to 0.5 grams and wherein the composition is essentially free of or completely free of and the method does not use lactoferrin other than apolactoferrin, Chromium sulfate (trivalent), chromium acetate (trivalent), chromium nitrate (trivalent), chromium chloride (trivalent), and chromium biphosphate (trivalent).

13. The method according to claim 12, wherein the subject has an iron deficiency, an iron overload, hemochromatosis and/or ferroptosis.

14. The method according to claim 12, wherein the composition is administered orally.

15. The method according to claim 12, further comprising reduction in iron build up in at least one organ of the subject.

16. The method according to claim 12, wherein the subject is not supplemented with iron.

17. The method according to claim 12, wherein the subject has an inherited condition called hemochromatosis.

18. A method of forming red blood cells and hemoglobin in a subject comprising:
   administering an effective amount of a composition comprising apolactoferrin and, but not other forms of lactoferrin other than apolactoferrin, chromium trivalent chloride to the subject, the effective amount of apolactoferrin is from about 0.1 to 0.5 grams, and the effective amount of chromium trivalent chloride is from about 100-350 mcg wherein the composition is made by spray-drying the apolactoferrin and chromium trivalent chloride fractions.

19. The method according to claim 18, wherein the subject has at least one risk factor selected from type 1 or type 2 diabetes, hypertension, autoimmune disease, asthma, cancer, irregular heartbeat, cirrhosis of the liver, darkening of the skin, abnormal heart rhythm, or arthritis.

20. The method according to claim 18, wherein the subject does not reduce iron levels by removing blood from the body.

\* \* \* \* \*